United States Patent
Arzumanyan et al.

(10) Patent No.: US 9,208,481 B2
(45) Date of Patent: Dec. 8, 2015

(54) TRANSACTION DATA CAPTURE DEVICE AND SYSTEM

(75) Inventors: Andre Arzumanyan, Newton, MA (US); David Arzumanyan, Newton, MA (US); Ken Clark, Tustin, CA (US); Tom Deutschman, Spokane, WA (US)

(73) Assignee: OmniLync, Inc., Newton, MA (US)

( * ) Notice: Subject to any disclaimer, the term of this patent is extended or adjusted under 35 U.S.C. 154(b) by 820 days.

(21) Appl. No.: 12/499,724

(22) Filed: Jul. 8, 2009

(65) Prior Publication Data

US 2010/0010905 A1    Jan. 14, 2010

Related U.S. Application Data

(60) Provisional application No. 61/079,055, filed on Jul. 8, 2008.

(51) Int. Cl.
| | |
|---|---|
| *G06Q 30/00* | (2012.01) |
| *G06G 1/12* | (2006.01) |
| *G06Q 20/00* | (2012.01) |
| *G06Q 20/04* | (2012.01) |
| *G06Q 20/20* | (2012.01) |
| *G07G 1/14* | (2006.01) |

(52) U.S. Cl.
CPC ............ *G06Q 20/0453* (2013.01); *G06Q 20/20* (2013.01); *G06Q 20/202* (2013.01); *G07G 1/14* (2013.01)

(58) Field of Classification Search
None
See application file for complete search history.

(56) References Cited

U.S. PATENT DOCUMENTS

| | | | | |
|---|---|---|---|---|
| 5,448,044 A | * | 9/1995 | Price et al. | 235/380 |
| 6,240,394 B1 | * | 5/2001 | Uecker et al. | 705/3 |
| 6,636,908 B1 | * | 10/2003 | Winokur et al. | 710/29 |

(Continued)

FOREIGN PATENT DOCUMENTS

| | | |
|---|---|---|
| WO | 2012156985 A2 | 11/2012 |
| WO | 2015/061583 A3 | 4/2015 |

(Continued)

OTHER PUBLICATIONS

Authorized Officer: Jin Tae Yu, Notification of Transmittal of the International Search Report and the Written Opinion of the International Searching Authority, or the Declaration, PCT/US/2009/049965, 12 Pages, Mar. 2, 2010.

(Continued)

*Primary Examiner* — Ariel Yu
(74) *Attorney, Agent, or Firm* — GTC Law Group LLP & Affiliates

(57) ABSTRACT

The present invention is directed to a device and system for capturing transaction data sent between a point of sale terminal and a peripheral device. The transaction data capture device includes an input for receiving transaction data sent from the point of sale terminal to a peripheral device during the course of a transaction with a customer and an output for transmitting the transaction data to the peripheral device. The transaction data capture device further includes a processor programmed to detect and save the transaction data received at the input and associate the transaction data with customer identity information identifying the customer. The transaction data capture device also includes a memory for storing the associated transaction data and customer identity and a network interface for routing the transaction data and associated identity information from memory over a data communications network.

17 Claims, 12 Drawing Sheets

(56) References Cited

U.S. PATENT DOCUMENTS

| | | |
|---|---|---|
| 8,170,936 B2 | 5/2012 | Ahmad et al. |
| 8,548,859 B2 * | 10/2013 | Matkovic ........................ 705/18 |
| 8,626,593 B2 | 1/2014 | Goldfinger et al. |
| 2002/0161721 A1 | 10/2002 | Yuan et al. ....................... 705/65 |
| 2003/0055727 A1 * | 3/2003 | Walker et al. ................... 705/14 |
| 2003/0088460 A1 | 5/2003 | Riordan et al. ................. 705/10 |
| 2003/0115135 A1 | 6/2003 | Sarfraz et al. ................... 705/39 |
| 2003/0158819 A1 | 8/2003 | Scott ............................... 705/65 |
| 2004/0039876 A1 * | 2/2004 | Nelson et al. .................. 711/115 |
| 2004/0064373 A1 | 4/2004 | Shannon ......................... 705/24 |
| 2005/0021480 A1 | 1/2005 | Haff et al. ....................... 705/75 |
| 2005/0165651 A1 * | 7/2005 | Mohan ............................. 705/26 |
| 2007/0050258 A1 | 3/2007 | Dohse ............................. 705/14 |
| 2007/0069013 A1 * | 3/2007 | Seifert et al. .................. 235/383 |
| 2008/0201213 A1 * | 8/2008 | Lee et al. ........................ 705/14 |
| 2010/0114677 A1 | 5/2010 | Carlson et al. |
| 2012/0253940 A1 | 10/2012 | Kibel et al. |
| 2014/0100932 A1 | 4/2014 | Goldfinger et al. |
| 2014/0122272 A1 | 5/2014 | Arzumanyan et al. |

FOREIGN PATENT DOCUMENTS

| | | |
|---|---|---|
| WO | 2015061583 A2 | 4/2015 |
| WO | 2015061583 A4 | 4/2015 |

OTHER PUBLICATIONS

PCT/US2014/061995, "International Application Serial No. PCT/US2014/061995, International Search Report and Written Opinion mailed Apr. 23, 2015", OMNILYNC, Inc., 8 pages.

* cited by examiner

TRANSACTION DATA CAPTURE DEVICE AND SYSTEM

The present application claims the benefit of U.S. Application Ser. No. 61/079,055, filed Jul. 8, 2008, which application is incorporated herein by reference in its entirety.

TECHNICAL FIELD

The present invention relates generally to data capture systems and data capture devices, and particularly with relation to point of sale systems.

BACKGROUND ART

Point of sale terminals, such as cash registers or self checkout terminals, generally provide customers with records of their transactions. The records may be either viewed on a display device or provided to the customer in the form of a paper receipt. Paper receipts are not very convenient because they are easy to misplace and are difficult to organize. Moreover, paper receipts may accumulate in one's pocket or purse and become more of a nuisance than a convenience. Furthermore, it may be difficult to search and sort paper receipts.

Other solutions in the prior art involve providing customers with digital receipts. Unlike paper receipts, digital receipts may be sorted and organized. In some systems for providing customer's with digital receipts, the customer carries a receipt card provided by a receipt card company. When the customer makes a purchase at a merchant point of sale terminal, the merchant identifies the customer using the receipt card. The merchant then establishes a communications link with the receipt card company and the digital receipt is transferred to the receipt card company over the internet. The customer can then view the digital receipt at the receipt card company website. In other systems, once the merchant identifies the customer, the customer can then specify a location to which the digital receipt may be sent. For example the digital receipt may be sent to a web address, a cell phone, or a personal digital assistant (PDA).

The digital receipt solution may prove impractical because it may require the merchant point of sale terminal to interface with a receipt card company or with a customer specific location. Yet, some merchant point of sale terminals may not be able to interface with a receipt card company or with a customer specific location (e.g. the point of sale terminals may not have internet connectivity). Also, digital receipts from different merchants may have different formats and may be encoded in different protocols. Therefore, even if the digital receipt is received by the receipt card company or the customer specific location, it may be difficult to analyze and read the digital receipt. In order to overcome these problems, each participating merchant may be required to incorporate various hardware and software modifications in order to standardize the interface between the many merchant point of sale terminals and the receipt card companies.

SUMMARY OF THE INVENTION

Illustrative embodiments of the present invention are directed to a device, system, and method for capturing transaction data sent between a point of sale (POS) terminal and a peripheral device during the course of a transaction with a customer. In a first embodiment of the invention there is provided a transaction data capture device for capturing transaction data and associating the transaction data with a customer. The transaction data capture device includes an input for receiving transaction data sent from the POS terminal to a peripheral device during the course of the transaction with the customer. The device also includes an output for transmitting the transaction data to the peripheral device. The device further includes a processor programmed to detect and save the transaction data and to associate the transaction data with customer identity information identifying the customer. The device is provided with a memory for storing the transaction data and associated customer identity information. The device also includes a network interface for routing the transaction data and associated identity information from memory over a data communications network.

The transaction data capture device may further comprise a customer interface for identifying the customer participating in the transaction with the POS terminal and for communicating the customer identity information along to the processor. The customer interface may be one of a radio-frequency identifier, a magnetic strip reader, or a bar code reader.

In illustrative embodiments of the present invention, it is intended that the transaction data capture device is transparent to the peripheral device and/or the POS. Thus, in some embodiments of the transaction data capture device, the input and output may be linked to facilitate passage of transaction data between the input and the output. In such an embodiment, a splitter may be coupled between the input and the output for replicating transaction data sent between the input and the output. The splitter may also be coupled to the processor so as to transmit the transaction data sent between the input and the output to the processor. In embodiments incorporating the splitter, the input may be a serial input and the output may be a serial output. For example, an RS-232 input and an RS-232 output may be used. In other embodiments incorporating the splitter, the input may be a parallel input and the output may be a parallel output.

In alternative or additional embodiments, the transaction data capture device does not include a splitter. In order to maintain transparency, the processor may be coupled to the input and the output, and may be programmed to perform handshaking functions characterizing the peripheral device. The processor may also be programmed to perform handshaking functions characterizing the POS terminal. Thus, the processor may accommodate data flow in both directions transparently between the POS terminal and the peripheral device. The processor may also be programmed to duplicate the transaction data sent to the input and transmit at least one copy of the transaction data to the output. In embodiments where the processor is coupled to the input and the output, without the use of a splitter, the input may be a USB input (e.g., slave) and the output may be a USB output (e.g., host). In some embodiments, the input may be an Ethernet connection and the output may be an Ethernet connection. In other embodiments the input and output may be serial connections or parallel connections.

In some embodiments of the invention, the transaction data capture device may include a plurality of inputs and outputs supporting a variety of different connections. For example, some embodiments of the transaction data capture device may include a number of inputs and outputs that incorporate splitters. Such embodiments may support both serial and parallel connections between the POS terminal and the peripheral device. In other embodiments, the transaction data capture device may include a number of inputs and outputs and a processor to perform handshaking functions for a number of different connection protocols. Such embodiments may support USB, Ethernet, serial and/or parallel connections. In further embodiments, the transaction data capture device may include both inputs and outputs that incorporate splitters, and inputs and outputs that use the processor for performing handshaking functions. Thus, certain embodiments of the transaction data capture device may be universally accepted at many different POS terminals and easily integrated into a merchant's POS terminal system regardless of whether the connections between the POS terminal and the peripheral device are USB, Ethernet, serial, or parallel connections.

Alternative embodiments of the present invention provide a system for collecting and displaying transaction data. The system includes a transaction data capture device including a network interface. The system also includes a server coupled to a data communications network. The server receives transaction data and associated customer identity information sent over the data communications network by the network interface of the transaction data capture device. The server may also communicate with a data repository that stores the transaction data and associated identity information. The server may also support applications that analyze and retrieve the transaction data stored in the data repository. The server may also provide the transaction data over a data communications network to a requesting end user via, for example, a website. In some embodiments, the server may support applications that sort the transaction data by at least one of date, transaction, item, price, and quantity. The server may then display the sorted data via the website.

Additionally, embodiments of the present invention may include a customer identifier that the customer carries in order to interface with the transaction data capture device. The customer identifier is used to interact the with customer interface of the transaction data capture device, or with a separate customer identification device, in order to identify the customer transacting with the POS terminal. The customer identifier may include one or more of a bar code, a magnetic strip, and a RFID tag.

In order to further capitalize on the advantages of the system, illustrative embodiments of the present invention may include a plurality of data capture devices located at a plurality of merchant commercial entities. For example, a first data capture device may be coupled to a POS terminal at a first merchant commercial entity and a second data capture device may be coupled to a second POS terminal at a second merchant commercial entity. The first merchant commercial entity and the second merchant commercial entity may be commercially unrelated entities. Yet, so long as the transaction data capture devices are installed at the different commercial entities, the transaction data from transactions with unrelated merchants may be communicated to the server and, thus, provided to the customer and other end users.

Furthermore, embodiments of the invention provide a method for collecting transaction data from a POS terminal. The method includes identifying a customer participating in a transaction with the POS terminal. A transaction data signal sent from the POS terminal to a peripheral device is received. The transaction data in the transaction data signal sent from the POS terminal during the course of the transaction is detected and saved to memory. The method further includes associating the transaction data with the identified customer and storing the transaction data and associated customer identity information in memory. Additionally, the method may include transmitting the transaction data to the peripheral device. Transmitting the transaction data to the peripheral device may be based upon a customer response. For example, a customer may be queried whether he would like a paper receipt as a record of his transaction. Based upon a response to the query, the transaction data may be transmitted to the peripheral device for printing whereupon the customer may be provided with a receipt. If the customer chooses not to take a receipt, the transaction data would not be transmitted to the peripheral device and consequently, the receipt would not be printed.

In other embodiments, the method includes routing the transaction data and associated identity information from memory over a data communications network to a server. The method may further include providing over the data communications network a graphical interface through which an end user may observe the transaction data. The graphical interface may be the server supported website, as described above. The end user may be the customer, but may also include any one of a merchant, the government, a marketing firm, or a statistical analysis firm.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Figure 1:
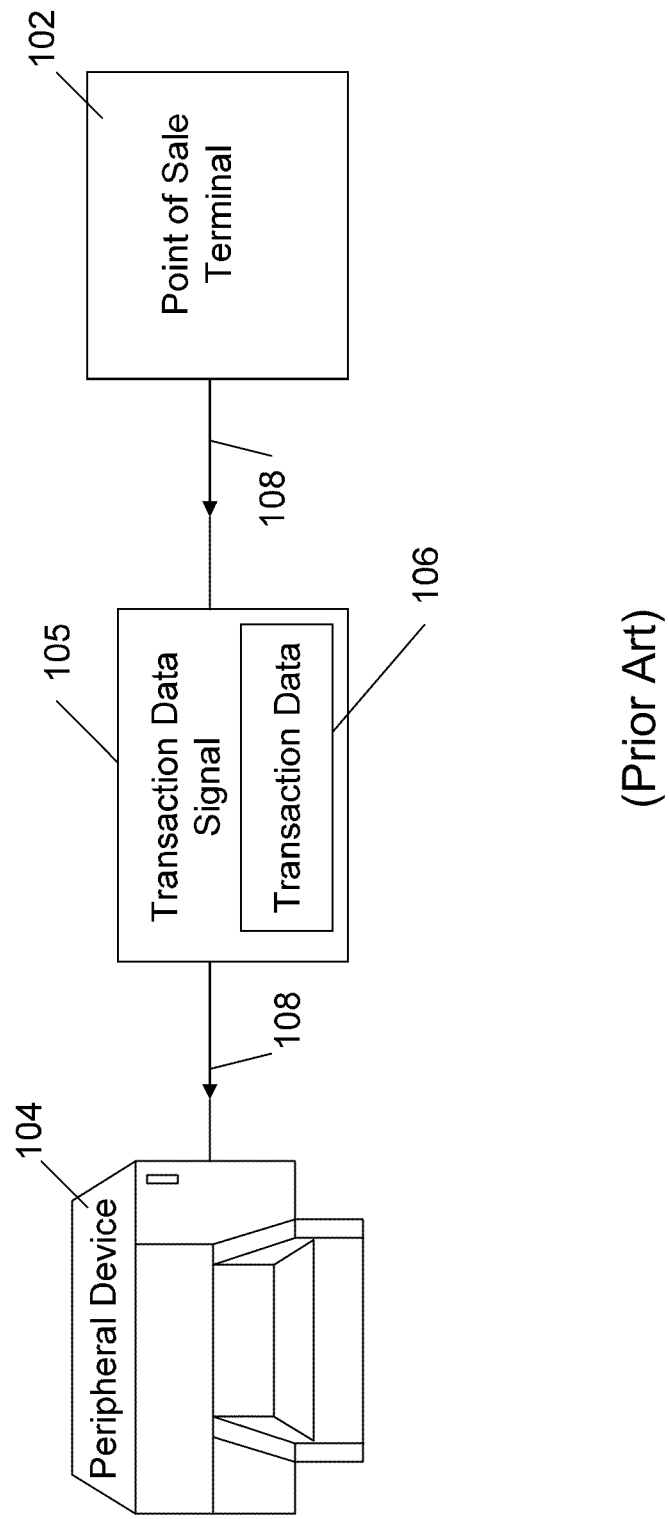
FIG. 1 depicts a prior art system, wherein the point of sale terminal device is coupled to a peripheral device.
Figure 2:
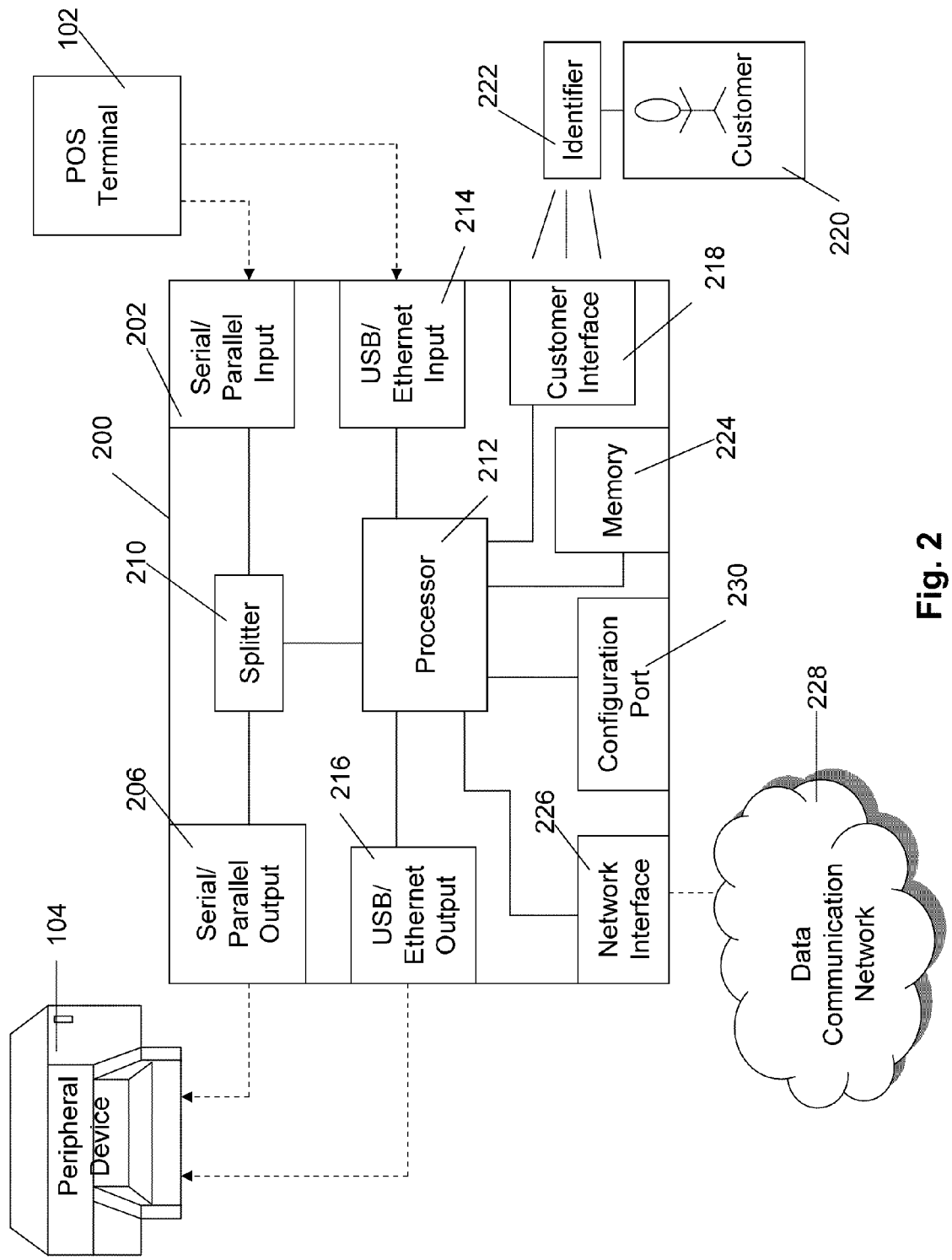
FIG. 2 depicts a transaction data capture device in accordance with one embodiment of the present invention.

FIG. 1 depicts an example of a point of sale (POS) terminal device 102 coupled to a peripheral device 104. The POS terminal device 102 sends a transaction data signal 105 to the peripheral device 104. The transaction data signal 105 includes transaction data 106 that is sent to the peripheral device 104. In accordance with illustrative embodiments of the invention, FIG. 2 depicts a transaction data capture device 200 that may be installed between a point of sale terminal 102 and a peripheral device 104 in order to receive the transaction data signal 105 and capture transaction data 106 that is sent along line 108, as depicted in FIG. 1. In accordance with exemplary embodiment of the present invention, the POS terminal 102 may be any device that facilitates a transaction between a customer and a merchant. The merchant may be a retailer, vendor, bank, or the government. A POS terminal 102 may be a cash register, a self checkout machine, an interactive kiosk, or any other transaction computer terminal. The transaction is not limited to the purchase of goods, but may be any agreement and/or exchange involving goods, services, information, and/or currency. A peripheral device 104 may be any device that is attached to a POS terminal 102 in order to expand its functionality. For example a peripheral device 104, may be a monitor, a scanner, a printer, or, more specifically, a receipt printer. The transaction data signal 105 may include any signal that is sent from the POS terminal to the peripheral device over line 108. The transaction data signal 105 typically includes the transaction data 106. The transaction data 106 may include substantive data such as, receipt data, warranty data, rebate data, or any other transaction record data, such as transaction records with banks or municipalities. The transaction data 106 may also include operational reports and financial reports generated by the POS terminal 102. The transaction data 106 may also include peripheral device command data. Peripheral device command data may include any commands relating to format of the data, font size, font style, font color, merchant logo, paper-cut function, and any other commands associated with displaying and/or printing data. The transaction data 106 may be encoded in ASCII, UTF8, or any other encoding protocol recognized in the art.

The transaction data capture device 200 includes an input 202 for receiving the transaction data signal 105 sent from a POS terminal 102 to a peripheral device 104. The input 202 is configured to be coupled to the POS terminal 102. More particularly, the input 202 is configured to be coupled to the POS terminal 102 at an interface that transmits transaction data 106 to the peripheral device 104. In this manner, the transaction data capture device 200 intercepts the transaction data signal 105 and transaction data 106 sent from the POS terminal 102 to the peripheral device 104. The input 202 of the device 200 is linked to an output 206 in order to facilitate the passage of transaction data 106 between the input 202 and the output 206. The output 206 is configured to be coupled to a peripheral device 104 in order to send the transaction data signal 105 and the transaction data 106 along to the peripheral device 104. It is intended that the input 202 and the output 206 be transparent to the peripheral device 104 and/or the POS terminal 102. In the embodiment depicted in FIG. 2, the input is a serial/parallel input 202 and the output is a serial/parallel output 206. The "serial/parallel" label for the input 202 and the output 206 denotes an embodiment of the input 202 and output 206 where a splitter 210 is coupled between the input 202 and the output 206. The serial/parallel input 202 and the serial/parallel output 206 may be parallel connections supporting parallel data sent between the POS terminal 102 and peripheral device 104. In other embodiments, the serial/parallel input 202 and the serial/parallel output 206 may be serial connections supporting serial data sent between the POS terminal 102 and peripheral device 104. For example, an RS-232 protocol may be used. If transaction data capture device 200 is to support both serial and parallel connections, then the transaction data capture device 200 includes dual serial/parallel inputs 202 and outputs 206. One serial/parallel input and output may be dedicated to serial connections between the POS terminal 102 and the peripheral device 104, and the other serial/parallel input and output may be dedicated to parallel connections between the POS terminal 102 and a peripheral device 104. Furthermore, it is important to note that illustrative embodiments of the serial/parallel input 202 and serial/parallel output 206 are not limited to serial and parallel connections.

In the embodiment depicted in FIG. 2, the splitter 210 is coupled between the serial/parallel input 202 and the serial/parallel output 206. The splitter 210 replicates the transaction data signal 105 and transaction data 106 as it passes between the serial/parallel input 202 and the serial/parallel output 206. The splitter 210 is also coupled to a processor 212 so as to transmit the replicated the transaction data signal 105 and transaction data 106 to the processor 212. The processor 212 detects the transaction data 106 in the transaction data signal 105 and saves the transaction data to a memory 224. The memory 224 may be, without limitation, a flash memory and/or SDRAM. In order to replicate the transaction signal 105 and data 106, the splitter 210 may include a physical split or "tee" in the link between the serial/parallel input 202 and the serial/parallel output 206. In other embodiments, the splitter 210 may include an inductive coil that replicates the transaction signal 105 and data 106 being sent through the link between the serial/parallel input 202 and the serial/parallel output 206. In another embodiment the splitter may optically receive, and thus, replicate infrared signals sent between the POS terminal and the peripheral device.

Data capture device 200 may also be provided with alternative transaction data signal inputs and outputs. In particular, some data input formats require active handshaking routines to receive and transmit data. USB and Ethernet connections are examples of such protocols that may require handshaking. To accommodate such protocols, a USB/Ethernet input 214 and a USB/Ethernet output 216 may be provided in connection to the processor 212. The "USB/Ethernet" label for the input 214 and the output 216 denotes an embodiment where the input 214 and output 216 are coupled to the processor 212 and where the processor performs handshaking functions. The USB/Ethernet input 214 and USB/Ethernet output 216 may be USB connections supporting USB data signals sent between the POS terminal 102 and peripheral device 104. The USB/Ethernet input 214 may be the USB slave and the USB/Ethernet output 216 maybe the USB host. In other embodiments, the USB/Ethernet input 214 and USB/Ethernet output 216 may be Ethernet connections supporting Ethernet data signals sent between the POS terminal 102 and peripheral device 104. The USB/Ethernet embodiment is not limited to USB and Ethernet connections and may also support other data connections. For example, USB/Ethernet input 214 and the USB/Ethernet output 216 may be parallel connections or serial connections. Although serial and parallel connections incorporating the splitter 210 may not require handshaking (e.g., serial/parallel embodiment), the USB/Ethernet input 214 and the USB/Ethernet output 216 supporting parallel connections or serial connections typically use handshaking. The transaction data capture device 200 includes a separate USB/Ethernet input 214 and USB/Ethernet output 216 for each different type of supported connection. Thus, illustrative embodiments of the transaction data capture 200 device may include four separate USB/Ethernet inputs 214 and USB/Ethernet outputs 216, each supporting any one of USB, Ethernet, serial, or parallel connections.

The processor 212, which is coupled to the USB/Ethernet inputs 214 and USB/Ethernet outputs 216, detects the transaction data 106 in the transaction data signal 105 that is received through the USB/Ethernet input 214. The processor 212 then duplicates the transaction data 106, saves one copy of the transaction data 106 to the memory 224, and sends another copy of the transaction data 106 along to the peripheral device 104. In some embodiments, the processor 212 may save and/or duplicate the entire transaction data signal 105. The processor 212 may be programmed to perform handshaking functions characterizing the peripheral device 104. In other words, in order for the USB/Ethernet input 214 to receive the transaction data signal 105 and transaction data 106 from the POS terminal 102, the processor 212 may emulate the handshaking functions of the peripheral device 104 so that the point of sale terminal is unaware of the presence of the data capture device 200. The processor 212 may also be programmed to perform handshaking functions characterizing the POS terminal 102 so that it can send the transaction data from the USB/Ethernet output 216 to the peripheral device 104. Thus, the programmed processor 212 may accommodate data flow in both directions transparently between the POS terminal 102 and the peripheral device 104 by emulating the hand shaking functions of the POS terminal 102 and/or the peripheral device 104. Handshaking may include emulating negotiations for signaling rate, framing conventions, error-detection, error-correction, flow control, and data encoding. The handshaking program may be based upon peripheral device drivers and may be installed into the processor 212 as software and/or firmware.

The processor 212 may also be coupled to a customer interface 218 for identifying a customer 220 that is participating in a transaction with the POS terminal 102. The customer 220 may be identified with a customer identifier 222 having customer identity information (e.g., customer specific number). The customer interface 218 may be a magnetic strip reader, bar code reader, or radio frequency identifier. A customer making use of the system will interact with the customer interface 218 with a corresponding customer identifier 222, such as a card having a magnetic strip, bar code, or RFID tag. In other embodiments, the customer interface 218 may be a key pad, and the customer interacting with the system simply enters customer identity information, such as a pass code, into the key pad. In other embodiments, the transaction data capture device 200 receives customer identity information from a separate customer identification device without need for a customer interface 218. The separate customer identification device may be the POS terminal 102 itself, or a separate keypad, bar code reader, magnetic strip reader, or radio frequency identifier. In other embodiments, the customer interface 218 may not be necessary because the customer identity information may be included within the transaction data 106 sent from the POS terminal 102.

Although the customer identity information may be received from different sources, once it is received, the customer identity information is saved into memory 224 (e.g., random access-memory). Once the processor 212 receives both the transaction data 106 (from a particular transaction) and customer identity information (from the particular transaction), the processor 212 retrieves the transaction data 106 and customer identity information from memory 224 and associates the transaction data 106 with the customer identity information. The association may be accomplished by marking the transaction data 106 with the customer identity information. In another embodiment, the association may be accomplished by marking each of the transaction data 106 and customer identity information with a time stamp. The association may also be accomplished by correlating customer identity information included within the transaction data 106, such as preferred customer number or payment card number (e.g., credit card or debit card), with known customer identity information. The processor 212 stores the transaction data 106 and associated customer identity information in memory 224. Thereby, the transaction data capture device 200 advantageously associates customer identity information with the customer's transaction data, so that in the future, a particular customer's transaction data may be readily identifiable.

Once transaction data is associated with customer identity information, the transaction data can be sent to a larger database of transaction records. Illustrative embodiments of the data capture device 200 include a network interface 226 to fulfill this functionality. The network interface 226 is coupled to the processor 212 and a data communications network 228. The data communications network 228 may be the internet, a local area network, or any other network through which data can be transferred. The network interface 226 may be, without limitation, an internet modem, an Ethernet modem, and/or a wireless modem. The network interface 226 accommodates the routing of the saved transaction data 106 and associated identity information over the data communications network 228 to a server.

The processor 212 controls which transaction data 106 will be routed via the network interface 226 to the server 228. In some embodiments of the data capture device 200, the processor 212 may be programmed to associate all the transaction data 106 with customer identity information and to route all of the transaction data 106 through the data communication network 228. In other embodiments, the processor 212 may be programmed to decode and differentiate between certain types of transaction data 106. For example, the processor 212 may be programmed to decode and differentiate between substantive data (e.g. receipt data) and peripheral device command data (e.g. logos and font style) and may only associate, save to memory, and route substantive data, while ignoring peripheral device command data. In another embodiment, the substantive data and peripheral device command data are decoded and portions of the substantive data and peripheral device command data may be associated, saved to memory, and routed, while the remaining portions of the substantive data and peripheral device command data are not sent to the server 228.

The embodiment depicted in FIG. 2 also contains a configuration port 230 that is coupled to the processor 212. The configuration port may be advantageously used to provide access for reprogramming and reconfiguring the processor 212. For example, software necessary to emulate the handshaking functionality of a new peripheral device 104 can be downloaded through the configuration port 230. However, the configuration port 230 may not always be required. Configuration of the processor may alternatively be handled through the serial/parallel input 202, the USB/Ethernet output 216, or the network interface 226. The network interface 226 may allow for remotely configuring the transaction data capture device 200.

Although not depicted, the data capture device may also include a graphical interface such as a monitor, for displaying transaction data and interacting with the merchant and/or customer. In another embodiment, the transaction data capture device 200 may include a port configured to be coupled to a graphical interface, such as a monitor. The transaction data capture device may also include other peripheral devices or ports for interfacing with peripheral devices, such as a key pads, touch screens, keyboards, and/or mice. Such additional devices facilitate customer and/or merchant interaction with the transaction data capture device 200.

In some embodiments, the transaction data capture device 200 may be programmed to function in any of three exemplary modes. In passive mode the transaction data capture device 200 forwards transaction data 106 from the POS terminal 102 to the peripheral device 104. In passive mode the transaction data 106 is not saved to memory 224 or transmitted over the data communications network 228. In copy mode, transaction data 106 is sent along to the peripheral device 104 and is saved to memory 224 at least temporarily. Once the customer swipes his customer identifier 222 or enters a pass code, the transaction data 106 is associated with the customer identity information, and eventually, sent along through the data communications network 228. The transaction data capture device 200 may also function in paperless mode. In paperless mode, the transaction data capture device 200 saves the transaction data 106 to memory 224 and associates the transaction data 200 with customer identity information. Then, the transaction data capture device 200 may cause or facilitate a query to the customer as to whether he would like a paper receipt as a record of the transaction. The query may be provided by a graphical interface, such as a monitor, in communication with transaction data capture device 200, or it may be communicated verbally by a cashier. The customer may respond to the query, for example, haptically with a keypad or touch screen, or verbally to the cashier. If the customer chooses to take a receipt, then the transaction data 106 is communicated to the peripheral device 104 for printing. If the customer chooses not to take a receipt, then the transaction data capture device 200 does not forward the transaction data 106 to the peripheral device 104. For example, in the USB/Ethernet embodiment described above, if the customer chooses not to print a receipt, the processor 212 receives the response from the button or touch screen and does not send a copy of the transaction data 106 to the peripheral device 104. In another example, the transaction data capture device 200 includes a toggle switch in communication with the processor 212 and/or the peripheral device 104. The toggle switch allows the cashier to manually control communication of the transaction data 106 to the peripheral device 104.

In another embodiment of the present invention, the transaction data capture device 200 includes a variety of inputs and outputs so that the data capture device 200 may be universally accepted at many different POS terminals and easily integrated into a merchant's POS terminal system. For example, the serial/parallel input 202 and the serial/parallel output 206 may be configured as RS-232 connections. The transaction data capture device 200 may also include another serial/parallel input, another serial/parallel output, and another splitter that are configured for parallel connections. The USB/Ethernet input 214 and the USB/Ethernet output 216 may be configured, respectively, as USB slave and USB host connections. The transaction data capture device 200 may also include another USB/Ethernet input and USB/Ethernet output that may be configured as Ethernet connections. Thus, such an embodiment, with four different inputs and outputs may be implemented into any merchant POS system that uses one of USB, Ethernet, serial, or parallel connections between the POS terminal 102 and the peripheral device 104.

Figure 3:
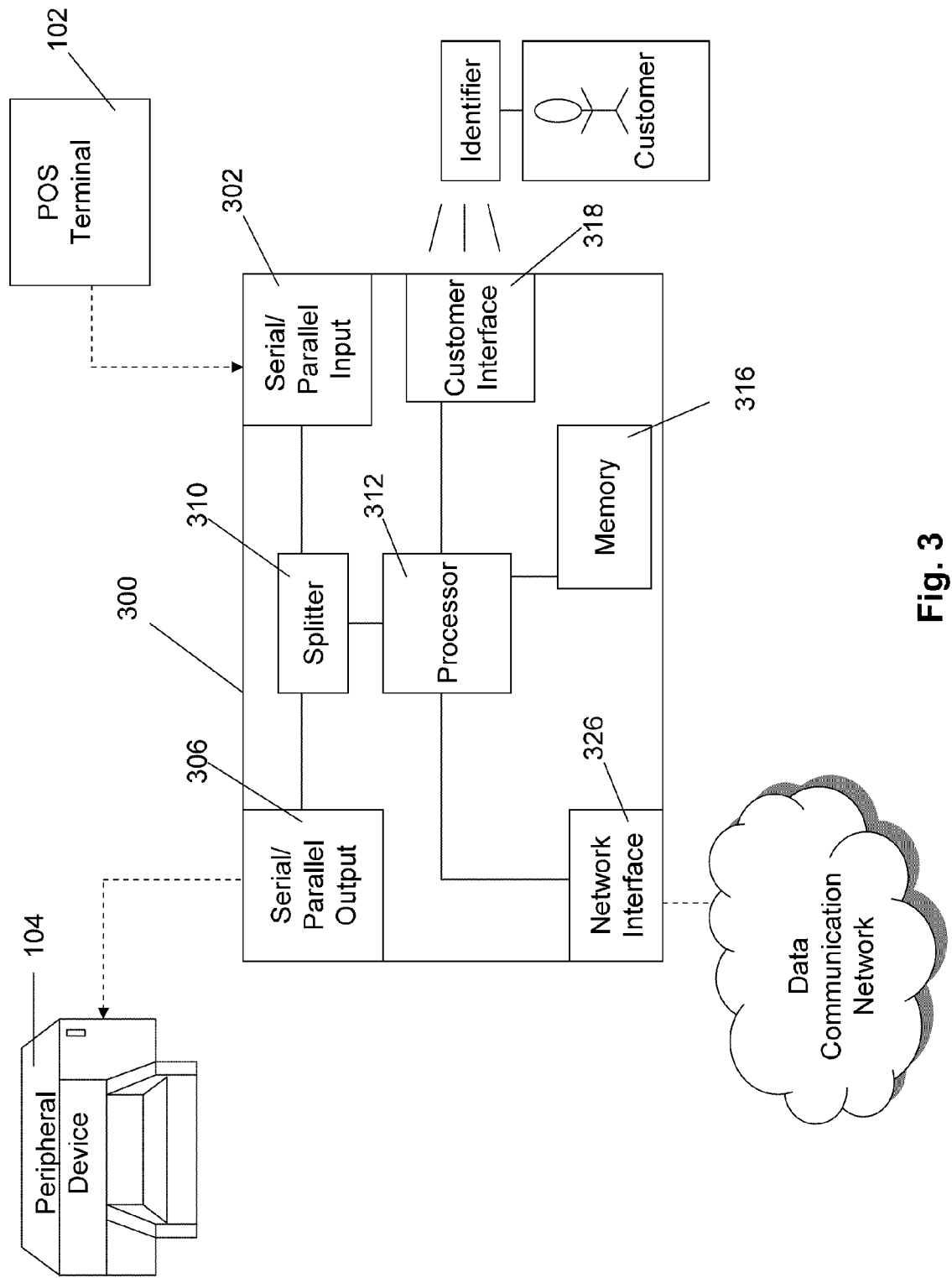
FIG. 3 depicts a transaction data capture device in accordance with an alternative embodiment of the present invention.

FIG. 3 depicts a transaction data capture device 300 for use with interfaces that do not require handshaking. In this embodiment, the transaction data capture device 300 includes the serial/parallel input 302, the serial/parallel output 306, the splitter 310 the processor, 312, the customer interface 318, the memory 316, and the network interface 326. However, this embodiment lacks USB and Ethernet functionality as it does not include the USB/Ethernet input 214 and the USB/Ethernet output 216. This embodiment may support a serial connection between the POS terminal 102 and the peripheral device 104 and/or parallel connections between the POS terminal 102 and the peripheral device 104.

Figure 4:
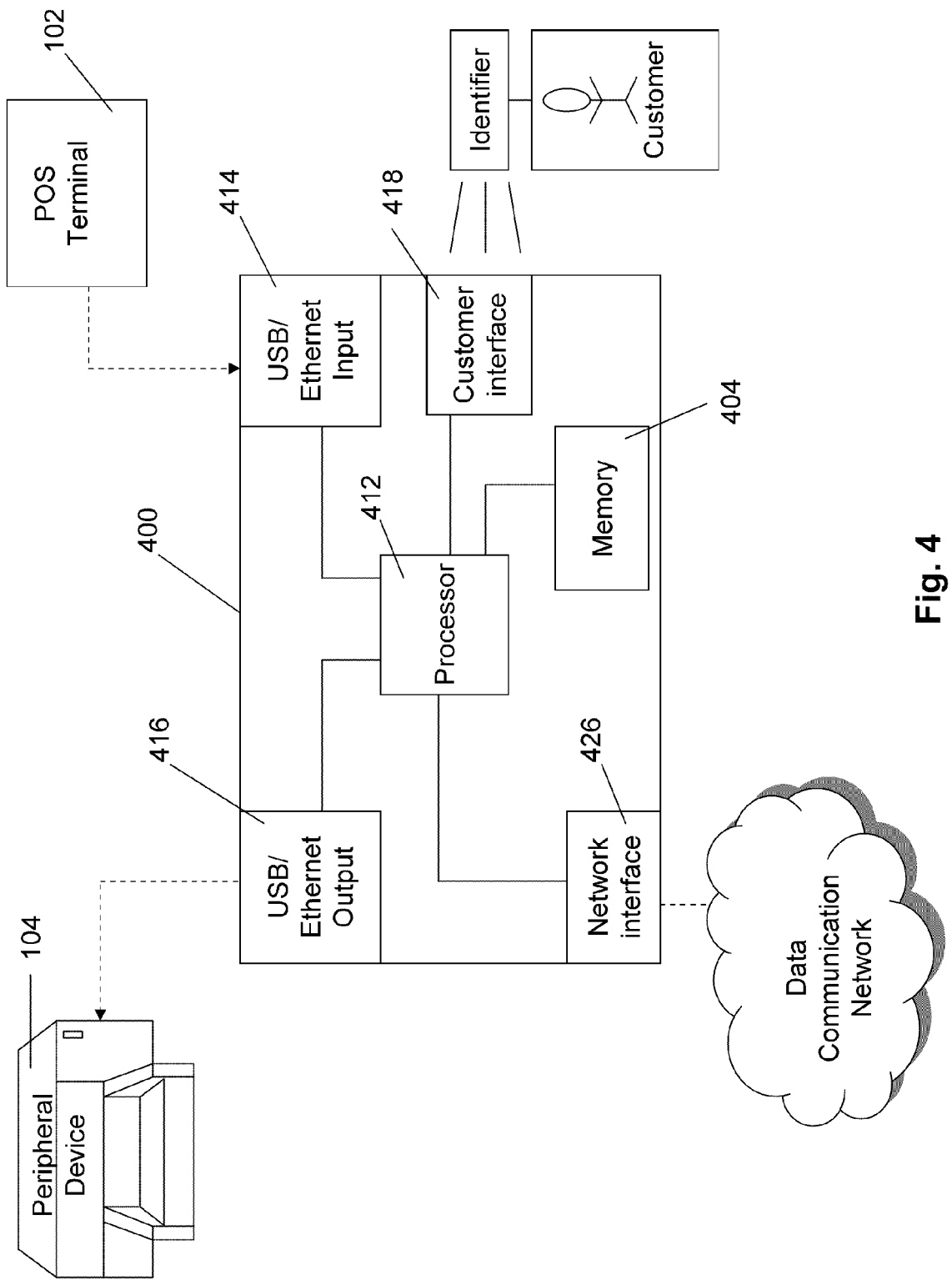
FIG. 4 depicts a transaction data capture device in accordance with an alternative embodiment of the present invention.

FIG. 4 depicts a transaction data capture device 400 that provides handshaking functions. In this embodiment, the transaction data capture device 400 includes the USB/Ethernet input 414, the USB/Ethernet output 416, the processor 412, the customer interface 418, the memory 404, and the network interface 426. However, this embodiment does not include the serial/parallel input 202, the serial/parallel output 206, and the splitter 210. As explained above, the USB/Ethernet input 414 and the USB/Ethernet output 416 may support a USB connection, Ethernet connection, serial connection, or parallel connection between the POS terminal 102 and the peripheral device 104.

Figure 11:
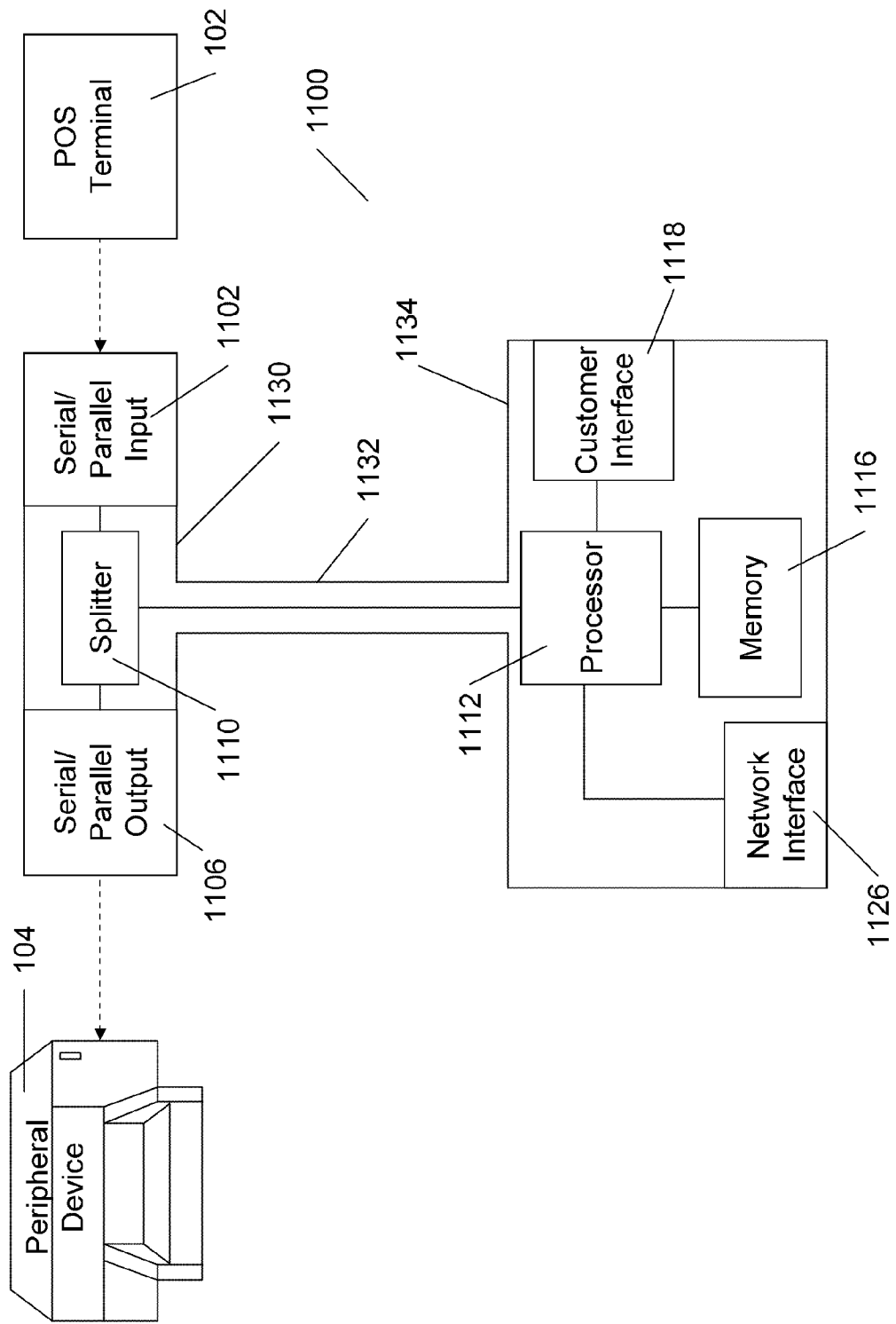
FIG. 11 depicts a transaction data capture device in accordance with an alternative embodiment of the present invention.

FIG. 11 depicts another transaction data capture device 1100 in accordance with illustrative embodiments of the present invention. In this embodiment the transaction data capture device 1100 includes a head portion 1130, a housing portion 1134, and a neck portion 1132. The head portion 1130 includes a serial/parallel input 1102, a serial/parallel output 1106, and a splitter 1110. The head portion 1130 is used to connect the transaction data capture device 1100 between a point of sale terminal 102 and a peripheral device 104. The splitter 1110 is coupled to a processor 1112 via the neck portion 1132. The processor 1112, customer interface 1118, memory 1116, and network interface 1126 are included in the housing portion. In some embodiments, the head 1130 and neck portions 1132 may be a cable or cord of varied length (e.g., 1 foot to 20 feet) which connect to the housing portion 1134. This configuration allows the head portion 1130 and the housing portion 1134 of the transaction data capture device 1100 to be conveniently installed at different locations. For example, the housing portion 1134 along with the customer interface 1118 may be located on the merchant's counter so that the customer may easily interact with the customer interface 1118, while the physical connections between the head portion 1130, POS terminal 102 (e.g., cash register), and peripheral 104 (e.g., printer), may be located out of sight under the counter or behind the cash register.

Figure 12:
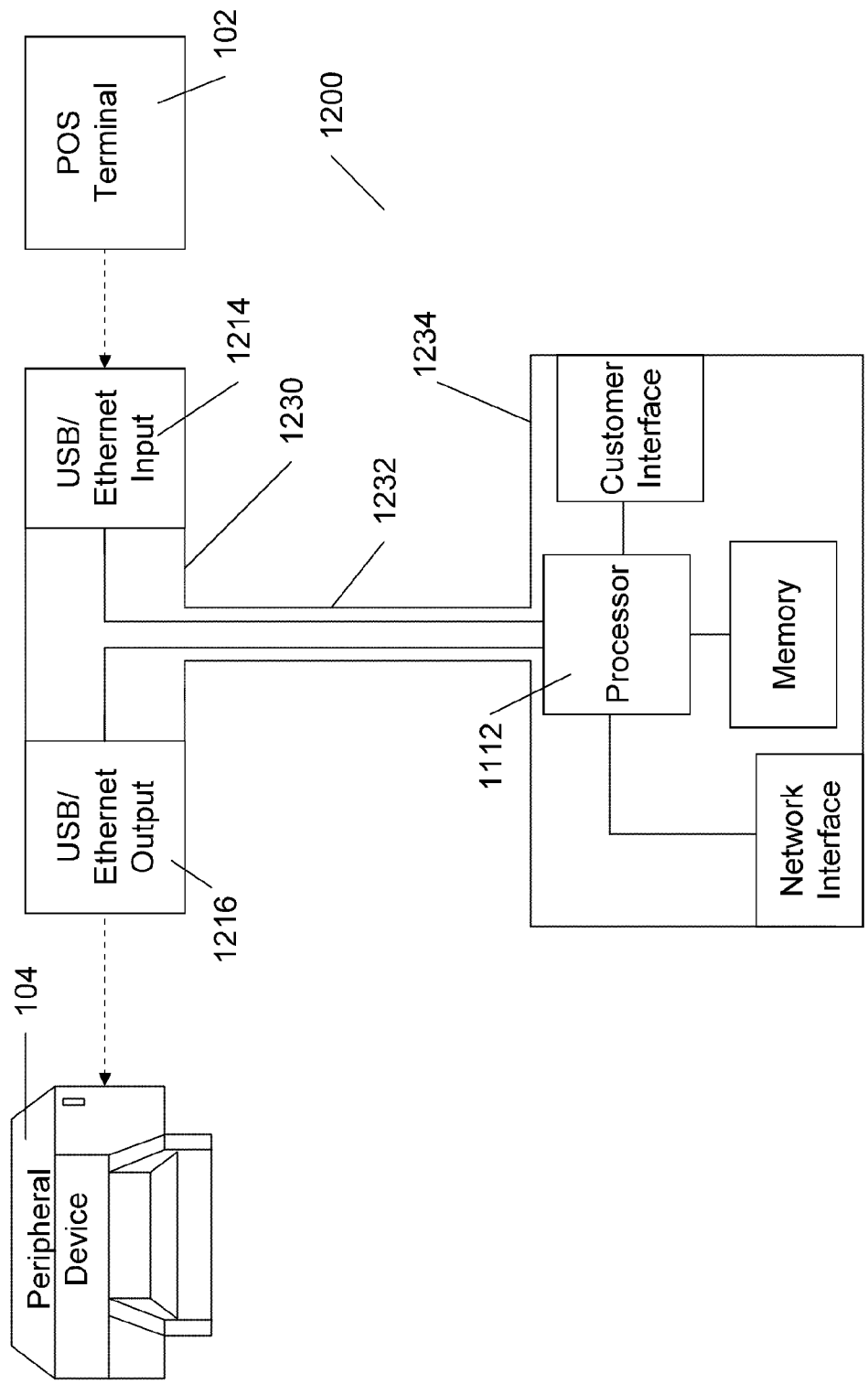
FIG. 12 depicts a transaction data capture device in accordance with an alternative embodiment of the present invention.

FIG. 12 depicts a transaction data capture device 1200 that also includes a head portion 1230, a housing portion 1234, and a neck portion 1232, and thus, has similar advantages to the transaction data capture device 1100 depicted in FIG. 11. However, FIG. 12 depicts a transaction data capture device that is directed towards USB and Ethernet connections between the POS terminal 102 and the peripheral device 104. Thus, in this embodiment, the head portion 1230 does not include the serial/parallel input 1102, the serial/parallel output 1106, and the splitter 1110, but instead includes a USB/Ethernet input 1214 and a USB/Ethernet output 1216. The USB/Ethernet input 1214 and the USB/Ethernet output 1216 are each coupled to the processor via the neck portion 1232. Otherwise the structural components of the housing portion 1234 are substantially the same as those described in the transaction data capture device 1100 of FIG. 11.

Note that, much like the transaction data capture device 200 depicted in FIG. 2, transaction data capture devices 1100 and 1200 may include a plurality of inputs and outputs. Also, transaction data capture devices 1100 and 1200 may include both USB/Ethernet inputs and outputs and also serial/parallel inputs and outputs.

Figure 5:
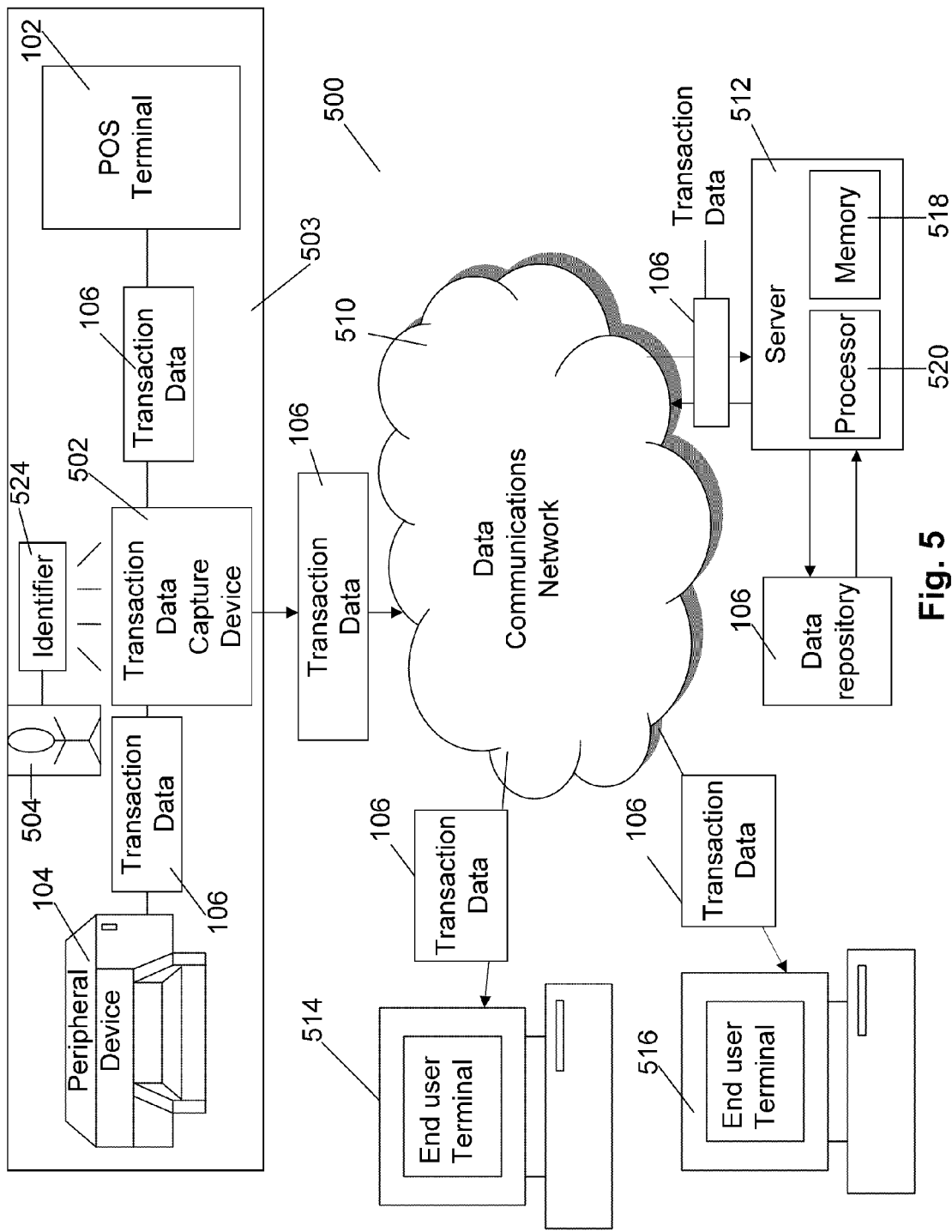
FIG. 5 depicts a transaction data capture system in accordance with one embodiment of the present invention.

FIG. 5 depicts a transaction data capture system 500 for collecting transaction data 106 and making it available to end users. The system 500 includes a transaction data capture device 502 that may be similar to transaction data capture devices 200, 300, 400, 1100, 1200 depicted, respectively, in FIGS. 2, 3, 4, 11, and 12. The transaction data capture device 502 may be located at a merchant commercial entity 503, such as a store, bank, airport, station, or kiosk. The transaction data capture device 502 may include a customer interface for identifying a customer 504 that is participating in a transaction with a POS terminal 102. The transaction data capture device 502 further includes an input coupled to the POS terminal 102 for receiving transaction data 106 sent from the POS terminal 102 to a peripheral device 104 during the course of the transaction. The transaction data capture device 502 includes an output coupled to the peripheral device 104 for transmitting the transaction data 106 to the peripheral device 104. The transaction data 106 capture device also includes a processor for detecting transaction data 106 received at the POS terminal input, associating the transaction data 106 with the accompanying customer identity information from the customer interface, and saving the transaction data 106 and associated customer identity information to memory. Also, the transaction data capture device 502 may include a network interface for routing the transaction data 106 and associated identity information from memory over a data communications network 510 (e.g. internet) to a server 512. Thus, as described above, the transaction data capture system 500 captures transaction data 106 sent between the POS terminal 102 and the peripheral device 104 at a merchant location 503, associates that transaction data 106 with a customer identity information, and makes it available to the server 512.

The server 512 may be coupled to the data communications network 510 in order to receive the transaction data 106 and associated customer identity information from the transaction data capture device 502 and for providing the transaction data 106 to requesting end users over the data communications network 510. The server 512 may also be in communication with a data repository 522 that stores transaction data 106 and associated customer identity information. The server 512 may also include a processor 520 that is programmed to perform different functions. In one embodiment, the processor 520 may be programmed to decode and differentiate between certain types of transaction data 106, as explained above for the data capture device 200. The processor 520 may also support applications that analyze and retrieve the transaction data stored in the data repository 552. In one example, the applications may be used to sort the transaction data 106 by date, transaction, item, price, and/or quantity.

In another embodiment of the present invention, the server 512 supports a website for displaying the transaction data to end users. The applications may be available to the end users through the website. The end users may be customers 504, merchants, the government, marketing firms, or statistical analysis firms. The requested transaction data may be pulled from server memory 518. Additionally or alternatively, the transaction data 106 may be routed from the server 512 and stored in a separate data repository 522. If the end user requests the transaction data 106, it can be pulled from the data repository 522 by the server 512.

In one illustrative embodiment of the invention, the website allows the end user to view a digital image of a receipt from a transaction (or, additionally, a digital rebate or warranty). In such an embodiment, the server 512 retrieves the substantive data and peripheral device command data associated with the transaction data 106 for a particular transaction. The application reads the substantial data and peripheral device command data, line by line, and reproduces an image of a receipt based on the formatting specification in the peripheral device command data and the substantive records in the substantive data. This digital image (e.g., graphic/bitmap image) may then be displayed to the end user via the website, or communicated to the user via, for example, e-mail. Additionally, such embodiments may also include applications that encrypt the image so that image is tamper-resistant.

The transaction data capture system 500 may further include an end user terminal 514 or a plurality of end user terminals 514, 516 for receiving the transaction data 106 over the data communications network 510 and displaying the transaction data 106 to the end users. In some embodiments, some or all of the above described applications may be located locally on the end user terminals 514, 516.

Before the server 512 sends the transaction data 106 to the end user, the server may verify the end user's identity. The verification may be accomplished through an associated username and password created when the end user first accesses the server supported website.

In another embodiment of the present invention, the transaction data capture system 500 includes a customer identifier 524 that the customer 504 may use to communicate with the customer interface to identify the customer transacting with the POS terminal 102. The customer identifier 524 may have encoded within it customer identity information for identifying the customer. The customer identifier 524 may be a card or badge that includes one of a bar code, magnetic strip, or an RFID tag. The customer identifier 524 may also be a customer debit card, credit card, or customer loyalty card. In other embodiments, the customer identifier may be, without limitation, a PayPass™, ExpressPay™, or SpeedPass™.

Figure 6:
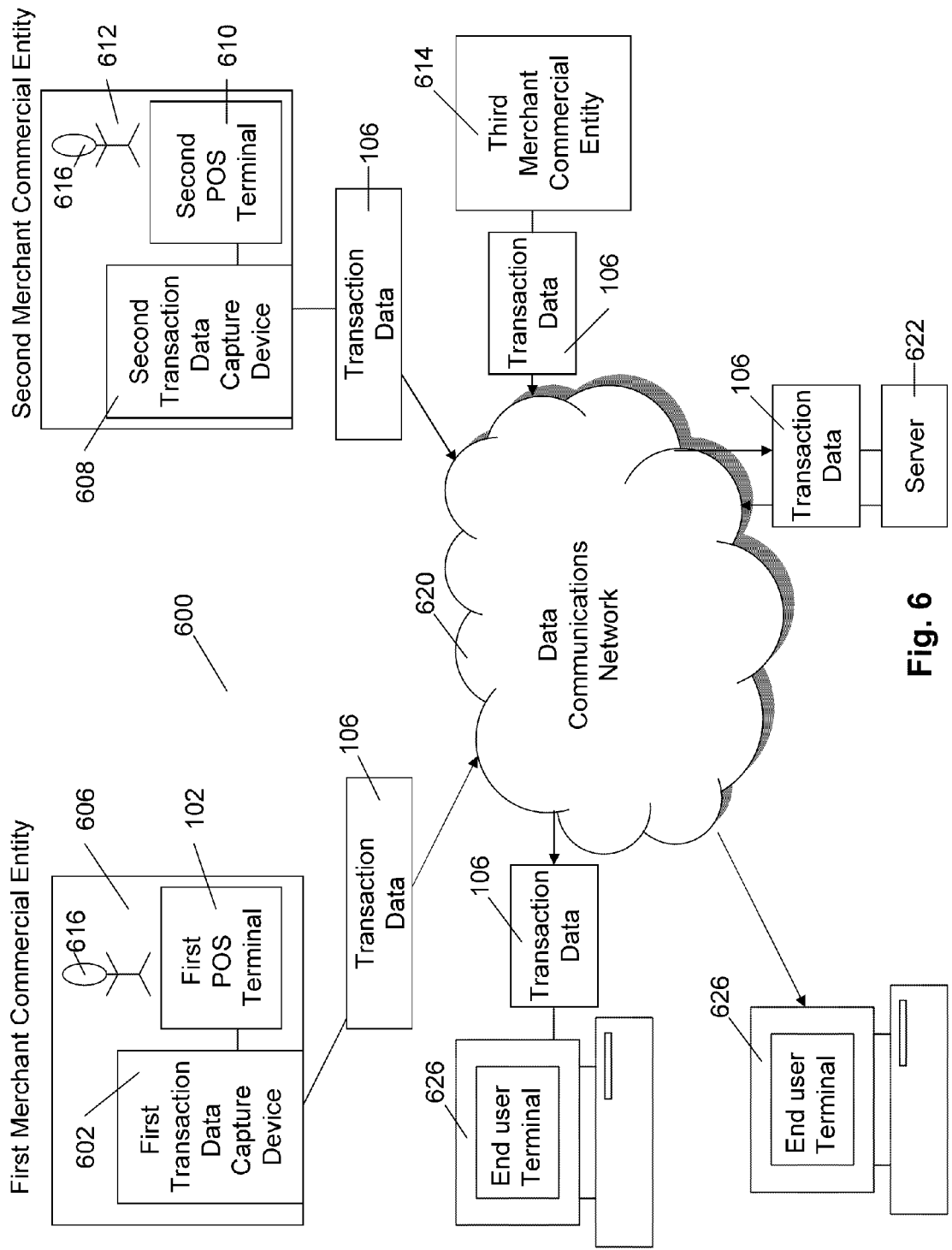
FIG. 6 depicts the transaction data capture system of FIG. 5 operable with different commercial entities in accordance with one embodiment of the present invention.

FIG. 6 depicts an advantage of the transaction data capture system 600 of FIG. 5. The data capture device system 600 may include a plurality of transaction data capture devices located at a plurality of different commercial entities. For example, a first data capture device 602 may be coupled to a first POS terminal 102, at a first merchant commercial entity 606. A second data capture device 608 may be coupled to a second POS terminal 610 at a second merchant commercial entity 612. The same arrangement may exist for a third merchant commercial entity 614 and many more merchant commercial entities. The commercial entities may be unrelated entities. In other words, the entities may have different POS systems with different receipt printers receiving data using different protocols. Because of the ability of the transaction data capture devices 600 to operate with a plurality of different POS terminals 102, 610 and peripheral devices (e.g. USB, Ethernet, Serial, Parallel), these data capture devices may be widely installed at the POS terminals of numerous merchants. Even though the POS terminals 102, 610 may be connected to different inventory or sales systems, the transaction data capture devices 602, 608 will be able to capture the transaction data 106 because, in most cases, each POS terminal 102, 610 will generate transaction data and will send the transaction data to a receipt printer and/or a display device. The transaction capture device 602, 608 may then capture the data as it is sent to the receipt printer or display device. Thus, the system may provide a widespread ability to gather transaction data 106 for use and analysis by the customer themselves or other end users.

In one exemplary embodiment, a customer 616 may make a first purchase at the first merchant commercial entity 606, the transaction data 106 from the purchase is captured by the first transaction data capture device 602 and sent through a data communications network 620 to a server 622. The customer 616 may then make a second purchase at the second merchant commercial entity 612. The transaction data 106 from the purchase is captured by the second transaction data capture device 608 and sent through the data communications network 620 to the server 622. The customer 616 may then access the transaction data 106 from both purchases at an end user terminal 626. The transaction capture system may allow the customer 616 to view the transaction data 106 from the purchases on a website supported by the server 622. Thus, a record of purchases can be amassed for the customer even though the customer shops at different unrelated merchants. While such a record has in the past been available from ones credit card records, this embodiment of the invention allows the production of sales receipt records regardless of whether a credit card, debit card, or cash is used in each transaction.

The website may function as typically known in the art. For example, the customer 616 may register with the website by providing a username, password, and contact information. Then, a customer identifier 524 may be sent to the customer via mail or e-mail, and/or the customer 616 may be provided with other customer identity information, such as a pass code. In another embodiment, the customer identifier 524 and/or pass code may be provided to the customer 616 at a merchant location. Once the customer is registered with the website and has the customer identifier 524, the transaction data 106 from any purchases the customer 616 makes with merchants that use the transaction data capture device 200 may be sent to the server 612. Once the transaction data 106 is received at the server 612, the customer 616 may be able to view the transaction data 106 by logging into the server supported website.

The customer 616 may then be able to search or sort the transaction data 106 by date, transaction, merchant, item, price, and/or quantity. Thus, the functionalities of the website, applications, and the supporting server 622 may be advantageously used by the customer 616 to organize and search his purchases. For example, the customer 616 may choose to categorize his purchases by item purchased. In so doing, the customer may view the quantity and cost for all of his purchases of cat food, followed by all of his purchases of cereal. The cat food and cereal categories may even be further subdivided into product brands. The website may also include applications for searching the transaction data 106 by date or time period. Thus, the customer 616 may be able to filter the transaction data 106 to show all his cat food purchases for the month of May 2008. The website may also have further applications for adding and calculating costs and quantities of purchases. Furthermore, the website may have applications for graphing and viewing trends in purchases. Such sorting, searching, calculating, and graphing techniques may help the consumer budget his spending and help him plan for future expenses and purchases.

The website may also include a printing application that allows the customer 616 to print the sorted transaction data 106 or print individual receipts, warranties, and/or rebates. For example, the customer 616 may be able to print out a receipt to show proof of purchase. In the case of a rebate, the customer 616 may be able to print out a rebate, fill it out, and send it in via normal mail. But the website may also provide a functionality wherein the rebate is filled in electronically and sent to a merchant electronically. Similarly, the website may also facilitate the processing or registration of product warranties. Indeed, any of the receipts, warranties, and/or rebates may be sent in electronic form via e-mail or downloaded onto a terminal device. The herein described functionalities of the website may also prove advantageous for accounting and tax purposes. For example, the customer 616 may be able to track all of his purchases of tax deductible items. When it is time to file his tax returns, the customer 616 may simply sort all of the purchases of the tax deductible items made over the last year and calculate the total value of the purchases. The customer 616 may then print out each receipt from the purchase and archive the printed receipts along with his tax return as proof of purchase.

The functionalities of the website may also prove advantageous for any of the end users of the website, not just the customer 616. The transaction data 106 provided to the end users may be provided with the associated customer identity information, without customer identity information, or in such a manner that the customer identity cannot be ascertained. Merchants, for example, may use the website to advertise products and services. Also, merchants may use the website to provide the individual with special offers, sales, awards, and/or sweepstakes. These advertisements, offers, awards, sales, and sweepstakes may be targeted based upon an analysis performed of the transaction data 106 corresponding to each customer 616. For example, a merchant may notice that the customer 616 regularly purchases peanut butter and consequently sends an e-mail to the customer 616 notifying them of a sale for peanut butter or for a complementary product, such as in this case, grape jelly.

Moreover, the merchants may use the transaction data capture device 602 to log and track sales. For example, each merchant may be assigned merchant identity information. In such an embodiment, the transaction data capture device 602 not only associates a copy of the transaction data 106 with customer identity information, but also associates another copy of the transaction data 106 with the merchant identity information. In some embodiments, the merchant can download the transaction data 106 directly from the transaction data capture device 200. Additionally or alternatively, the transaction data 106 and the associated merchant identity information are sent to the server 622 and the merchant may view the transaction data at the website. Thus, a copy of the transaction data may also be available for the merchants to view at the website once the transaction data capture device 602 sends the transaction data 106 to the server 622. The website may provide the merchant with the similar sorting, searching, calculating, and graphing applications available to the customer 616. Thus, the transaction data capture device 602 may be helpful for tracking merchant sales and inventory, as well as operational reports and financial reports generated by the POS terminal 102. Furthermore, through use of the website and its supporting applications, the merchant may generate, for example, end-of-the-day and/or end-of-the-week reports that summarize all of the purchases from a merchant over a particular time frame. The purchase tracking functionalities of the transaction data capture device and the website may help merchants comply with federal and state record keeping regulations.

The transaction data 106 provided by the web site may also prove helpful for marketing firms and statistical analysis firms. These firms may perform an analysis of the transaction data 106 using the functionalities of the website or they may download the transaction data 106 and perform an analysis of the data using their own software. These firms may track consumptive patterns of consumers and may perform an analysis of the transaction data 106 using statistical analysis and/or any other demographic analysis method known in the art. The firms may use the transaction data 106 to devise marketing and advertisement strategies. For example, the firms may devise targeted advertisements for specific demographics. The targeted advertisements and advertisement strategies may then be sold to third parties, such as merchants and retailers.

The website may also prove useful for the government. The government may find the website and the transaction data capture device 602 useful in tracking purchases at government and municipal facilities. For example, states may use the website and the transaction data capture device to track purchases at state liquor stores, registration and license fees at motor vehicle offices, and violation payments at town halls. In the same respect, the customer 616 may use the website to track and record his transactions made with government and municipal facilities. The government may use the website to check the accuracy of statements made in a tax return. Other verification entities may also use the website to verify and track the purchases of the customer 616. For example, if the customer 616 applies for a loan and makes statements about the value of his automobile, the verification entity may use the website to verify the actual amount paid for the automobile.

Moreover, if the transaction data capture device 602 is installed at bank cashier windows and/or at ATMs, then the customer 616 may use the website to track and record his bank transaction records. Thus, the customer 616 may advantageously keep a record of deposits and withdrawals made with the bank. Yet, these examples are not exclusive, and many other advantages and benefits of the website and transaction data capture device system may be apparent to those of ordinary skill in the art.

Figure 7:
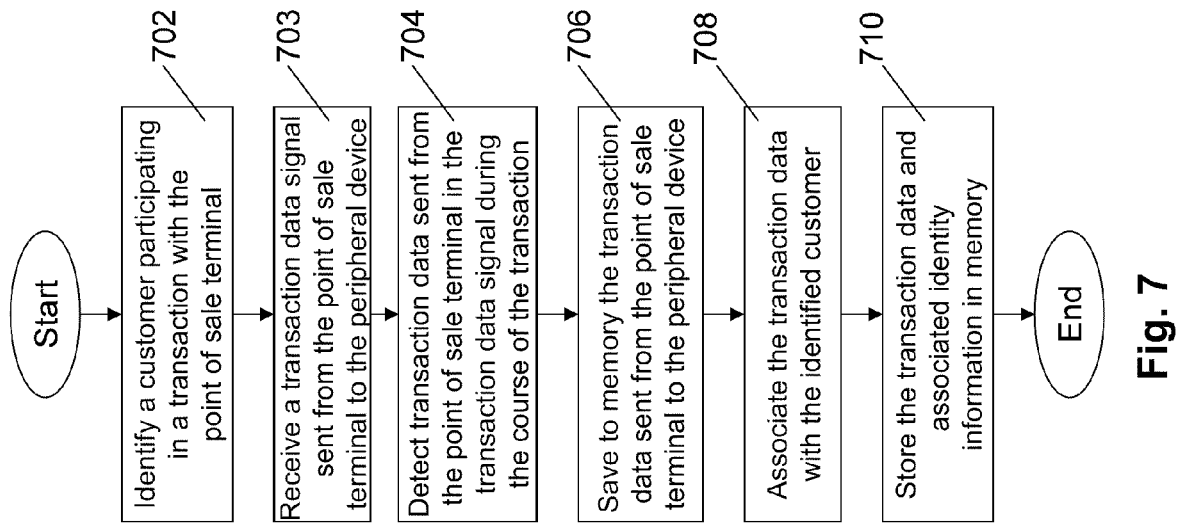
FIG. 7 depicts a method for capturing transaction data in accordance with one embodiment of the present invention.

FIG. 7 depicts a method for capturing transaction data at a POS terminal. In the embodiment depicted, a customer 616 participating in a transaction with the POS terminal is identified 702. Identification may be accomplished, for example, with the customer interface 218 of the data capture device 200 and, as described above, with the use of the customer identifier 222 including a bar code, magnetic strip, or RFID tag, or through manual entry of a code. Next, the transaction data capture device 200 receives the transaction data signal sent from the POS terminal to the peripheral device 703. As the signal is received, the transaction data sent from the POS terminal to the peripheral device during the course of the transaction is detected 704. The transaction data may be detected, as described above, by the processor 212 of the transaction data capture device 200. Once the transaction data is detected, it is saved to memory 224, 706.

In embodiments where the POS terminal is connected to the transaction data capture device via a serial or a parallel connection, the method may also include replicating the transaction data and the transaction data signal with the use of the splitter 210 as it is sent along to the peripheral device. The replicated transaction data and signal is then sent to the processor 212 and is saved into memory 224. In some embodiments where the POS terminal is coupled to the transaction data capture device 200 via a USB or an Ethernet connection, the method may include duplicating the transaction data and saving a copy of the transaction data to memory 224.

The method depicted in FIG. 7 further includes associating the transaction data with the identified customer 616, 708. The association may be accomplished by the processor 212. As explained above, the processor 212 may be programmed to decode the transaction data and, then, associate all or part of the transaction data with customer identity information. Once the processor 212 associates the transaction data with the customer identity information, the processor 212 may store the transaction data and associated customer identity information in memory 224, 710.

Figure 8:
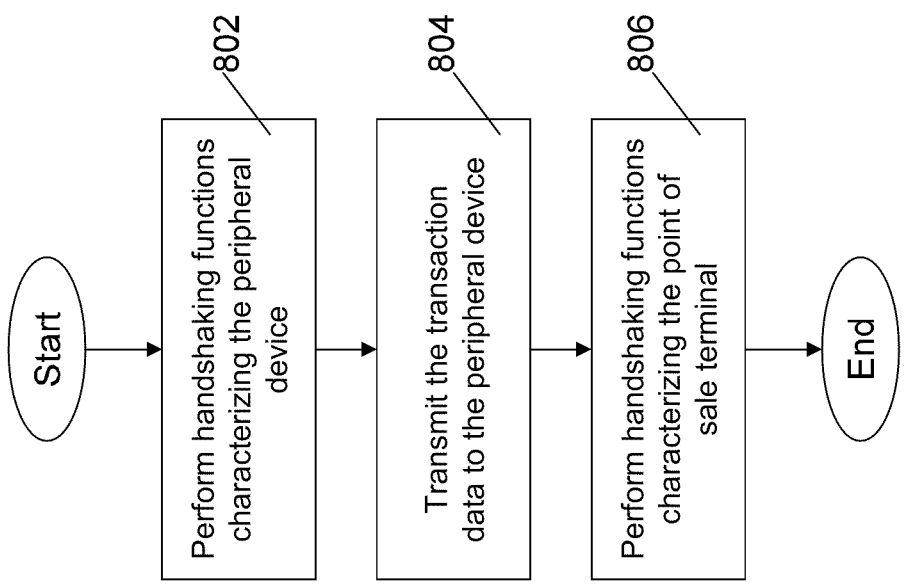
FIG. 8 depicts a method for capturing transaction data in accordance with an alternative embodiment of the present invention.

FIG. 8 depicts an alternative embodiment of a method for capturing transaction data at the POS terminal. In some embodiments, the method may further include transmitting the transaction data to the peripheral device 804 and performing handshaking functions characterizing the peripheral device 802 and the point of sale terminal 806. The handshaking functions and transmitting functions may be carried out by the programmed processor 212 described above. The processor 212 may be programmed to receive all of the transaction data from a single transaction and transmit the transaction data to the peripheral device. However, in another embodiment, the processor 212 may be programmed to receive transaction data from a single transaction and transmit the transaction data to the peripheral device as the transaction data is received.

Figure 9:
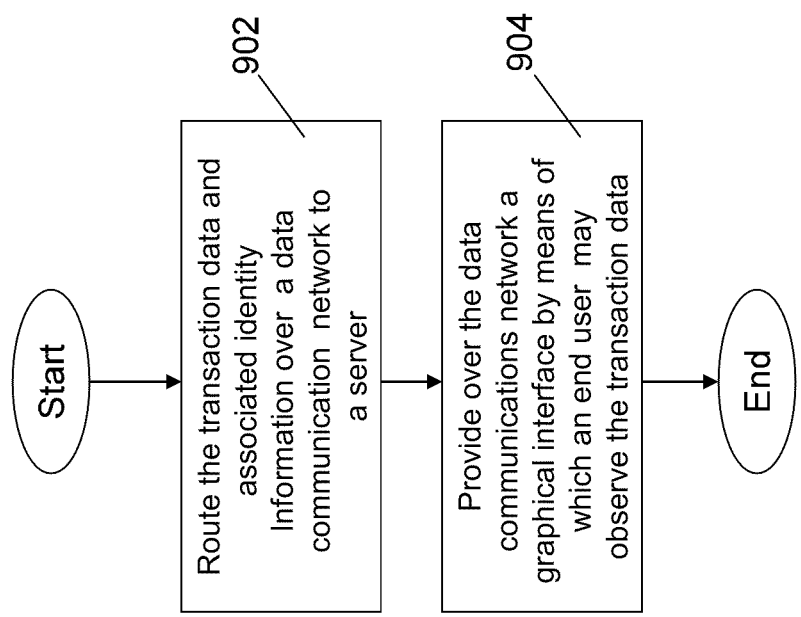
FIG. 9 depicts a method for providing transaction data to an end-user in accordance with one embodiment of the present invention.

Once the transaction data is captured, FIG. 9 depicts a method for providing transaction data to an end-user. The method includes routing the transaction data and associated identity information over a data communications network to a server 902. The routing function may be accomplished by, for example, the processor 212 and the network interface 226 of the transaction data capture device 200. Once the transaction data is received at the server, the server can provide over the data communications network a graphical interface through which the end user may observe the transaction data 904. As explained in further detail above, the graphical interface can be provided by a server supported website.

Figure 10:
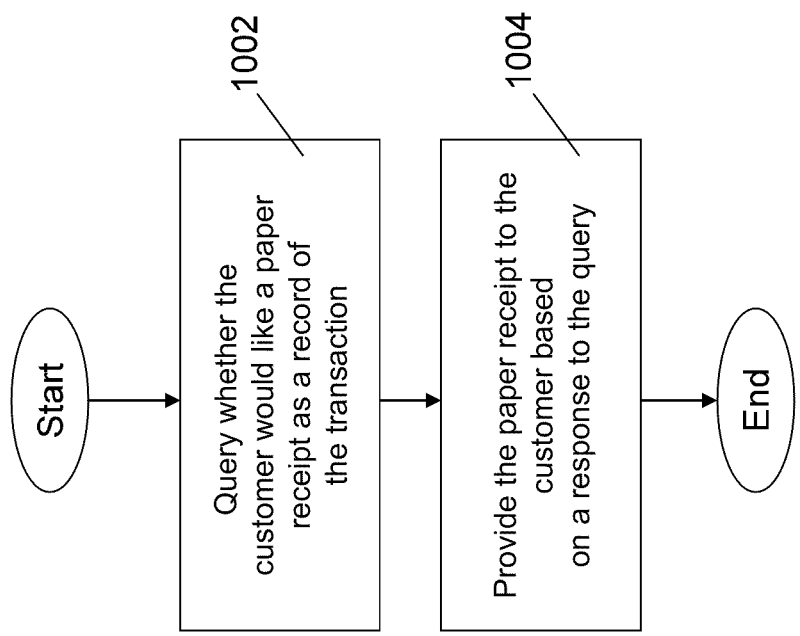
FIG. 10 depicts a method for providing a customer with a receipt based on a customer response in accordance with one embodiment of the present invention.

FIG. 10 depicts a method for providing a customer 616 with a receipt based upon the customer's response. The method includes querying whether the customer 616 would like a paper receipt as a record of the transaction 1002. The querying functionality may be performed by a graphical interface coupled to the transaction data capture device 200. In other embodiments, the querying functionality may be performed by the merchant. Once a response is provided, the paper receipt is provided to the customer 616 based upon the response to the query 1004. The response may be in an oral form or it may be in the form of a haptic response into, for example, a keypad or a touch screen. In some embodiments, the response may not come from the customer 616, but instead the merchant may decide whether to provide the customer 616 with the paper receipt. Once the response is ascertained, the paper receipt is provided to the customer 616 based upon the response to the query 1004. If the customer 616 does not want a receipt, then the transaction data capture device 200 does not transmit the transaction data to the peripheral device for printing. If the customer 616 wants a receipt, then the transaction data is transmitted to the printer and the paper receipt is printed. By querying whether the customer 616 would like a paper receipt, the method benefits the customer, merchant, and the environment. As a result of the query, the customer 616 may not need to deal with the nuisance of carrying a paper receipt and, if the customer prefers not to have a paper receipt, then the merchant will save on paper costs. Also, with less paper being used, there will be a positive impact on the environment.

Although various exemplary embodiments of the invention have been disclosed, it should be apparent to those skilled in the art that various changes and modifications can be made. Furthermore, it should be apparent to those skilled in the art that the transaction data capture device of the present invention may be beneficial in a number of different settings. For example, illustrative embodiments of the present invention may be inserted into automated or semi-automated industrial and manufacturing systems. A data capture device inserted between a main terminal and a manufacturing station may be useful in monitoring and collecting control data sent to and from the manufacturing station. A manufacturing station may be any machine used in the manufacture, assembly, and/or delivery of a product. Accordingly, in the industrial setting, the transaction data capture device may facilitate quality control and may help track the performance and productivity of the manufacturing system. In another example, illustrative embodiments of the present invention may be used in a medical environment. A transaction data capture device may be integrated into medical systems and processes for capturing medical records and information. For example, a transaction data capture device may be used to capture an image sent from an ultrasound to a terminal computer. The transaction data capture device may then associate that image with a particular patient. In this manner, the transaction data capture device builds redundancy into the medical systems and processes.

In an alternative embodiment, the disclosed system and methods (e.g., see the various flow charts described above) may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be a tangible medium (e.g., optical or analog communications lines). The series of computer instructions can embody all or part of the functionality previously described herein with respect to the system.

Those skilled in the art should appreciate that such computer instructions can be written in a number of programming languages for use with many computer architectures or operating systems. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

Furthermore, such instructions may be stored in any memory device, such as semiconductor, magnetic, optical or other memory devices, and may be transmitted using any communications technology, such as optical, infrared, microwave, or other transmission technologies. Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

All such changes and modifications are intended to be covered to the extent permitted by the following claims.

What is claimed is:

1. A transaction data capture device, the transaction data capture device comprising:
    a head portion comprising:
        a serial/parallel input adapted to physically couple to an output of a point of sale terminal and to receive transaction data sent from the point of sale terminal to a peripheral device during the course of a transaction with a customer;
        a serial/parallel output which is adapted to physically couple to an input of the peripheral device and to transmit the transaction data to the peripheral device;
        a splitter;
    a processor in communication with the splitter and programmed to detect and save the transaction data and associate the transaction data with customer identity information identifying the customer,
    a memory for storing the associated transaction data and customer identity information, and
    a network interface for routing the transaction data and associated identity information from memory over a data communications network,
    wherein such input, output, processor, memory and network interface are disposed in and preserve an existing data connection between a point of sale terminal and the peripheral device, and wherein such point of sale terminal and such peripheral device are physically separate from the transaction data capture device.

2. A device according to claim 1, further comprising:
    a customer interface for identifying the customer participating in the transaction with the point of sale terminal and communicating customer identity information to the processor.

3. A device according to claim 2, wherein the customer interface is at least one of a radio-frequency identifier, a magnetic strip reader, and a bar code reader.

4. A device according to claim 1, wherein an output for the point of sale terminal is linked to an input for the peripheral device in order to facilitate passing the transaction data between the input and the output.

5. A device according the claim 4, further comprising:
    a splitter coupled between the input and the output, the splitter being adapted to replicate the transaction data,
    wherein the splitter is also coupled to the processor so as to transmit the transaction data to the processor.

6. A device according to claim 5, wherein the input is a serial input and the output is a serial output.

7. A device according to claim 5, wherein the input is a parallel input and the output is a parallel output.

8. A device according to claim 1, wherein the processor is coupled to an input and is programmed to perform handshaking functions characterizing the peripheral device.

9. A device according to claim 8, where in the processor is coupled to an output and is programmed to perform handshaking functions characterizing the point of sale terminal.

10. A device according to claim 8, wherein the processor is programmed to duplicate the transaction data sent to the input and transmit at least one copy of the transaction data to the output.

11. A device according to claim 10, wherein the input comprises any of a USB input, an Ethernet input, an Ethernet input, a parallel input, and a serial input and the output comprises any of a USB output, an Ethernet output, a parallel output, and a serial output.

12. A device according to claim 1, wherein the device has a plurality of terminal inputs and a plurality of outputs.

13. A device according to claim 1, wherein the point of sale terminal is a cash register.

14. A device according to claim 1, wherein the peripheral device is a receipt printer.

15. A device according to claim 1, wherein the transaction data includes a receipt.

16. A device according to claim 1, wherein the transaction data includes at least one of a warranty, a rebate, an operational report generated by the point of sale terminal, and a financial report generated by the point of sale terminal.

17. A device according to claim 1, wherein the data communications interface is at least one of an internet modem, an Ethernet modem, and a wireless modem.

* * * * *